United States Patent [19]

Schaefer et al.

[11] 4,299,860
[45] Nov. 10, 1981

[54] SURFACE HARDENING BY PARTICLE INJECTION INTO LASER MELTED SURFACE

[75] Inventors: Robert J. Schaefer, Springfield; Jack D. Ayers, Oakton, both of Va.; Thomas R. Tucker, Worthington, Ohio

[73] Assignee: The United States of America as represented by the Secretary of the Navy, Washington, D.C.

[21] Appl. No.: 185,039

[22] Filed: Sep. 8, 1980

[51] Int. Cl.³ .............................................. B05D 3/06
[52] U.S. Cl. .......................... 427/53.1; 217/121 LE; 427/319
[58] Field of Search ...................... 427/53.1, 318, 319; 219/121 LE, 121 LF, 121 LM; 427/318, 319

[56] References Cited

U.S. PATENT DOCUMENTS

| | | | |
|---|---|---|---|
| T967,009 | 2/1978 | Gale | 427/53.1 |
| 1,654,509 | 12/1927 | Claus | 427/422 |
| 3,148,086 | 9/1964 | Seibert | 427/319 |
| 4,051,275 | 9/1977 | Forestek | 427/319 |
| 4,157,923 | 6/1979 | Yen et al. | 427/53.1 |
| 4,200,669 | 4/1980 | Schaefer et al. | 427/53.1 |

*Primary Examiner*—John H. Newsome
*Attorney, Agent, or Firm*—R. S. Sciascia; William T. Ellis; Kenneth E. Walden

[57] ABSTRACT

A method of impregnating the surface of a metal substrate with wear resistant particles to impart wear resisting characteristics to the surface. The substrate surface is subjected to a relatively moving high-powered laser beam to cause localized surface melting in passes thereacross, and hard wear resistant particles are forcibly velocity injected into the melt. The particles are captured upon solidification of the melt pool and retained therein by metallurgical bond. A wear resistant layer is formed which is an integral part of the underlying material.

18 Claims, 3 Drawing Figures

SURFACE HARDENING BY PARTICLE INJECTION INTO LASER MELTED SURFACE

BACKGROUND OF THE INVENTION

Wear-resistant coatings containing hard-phase particles embedded in a more ductile matrix can be produced by several methods. In flame or plasma spray type processes, hard particles such as carbides, borides, or silicides, coated or mixed with more ductile materials such as cobalt, nickel or iron alloys, are heated and propelled toward a substrate by a flame or plasma. Coatings made by these processes commonly contain extensive porosity and are frequently not tightly bonded to the substrate. The hard particles and the ductile matrix material are both subjected to the same thermal environment, with the result that in some cases the hard particles dissolve excessively in the matrix and lose their effectiveness. In detonation-gun processes, powders similar to those used of plasma spraying are employed, but they are propelled by detonating a mixture of acetylene and oxygen. The coatings have better bonding and less porosity than those produced by plasma spraying, but they still suffer from the same defects. The process is expensive and extremely noisy. In weld-cladding a rod of coating material is used to lay down a surface layer by a welding process. This method is applicable only to certain alloys in which the hard and ductile phases are in thermodynamic equilibrium, and is only useful where quite thick layers are desired. The laser spray process employs the laser beam to deliberately heat the coating material to temperatures so high that volatization of the powder will propel it toward the substrate and cause it to be deposited on the substrate. This process is only suitable for the deposition of coating materials with a suitably high vapor pressure at the temperature they achieve in the beam. This high vapor pressure is generally achieved at temperatures above the melting point of the coating material.

It is known in the art to use laser beams in surface alloying for achieving case hardening. For example, see U.S. Pat. No. 4,157,923, which discloses several embodiments for processing selected surface areas such as for surface wear characteristics or extended fatigue life. It is further known as disclosed in U.S. Pat. No. 4,125,926 to build up an aluminum or aluminum alloy surface, such as a piston ring groove, by applying a powder of metal harder than the aluminum and melting it by electromagnetic energy so as to provide a diffusion zone of an alloy of the metal powder and aluminum or aluminum alloy at the interface for establishing a harder surface.

One method of alloying a wear resistant coating to the surface of a substrate is disclosed in United States Defensive Publication No. T967,009. A coating of wear resistant particles and another element, having a lower melting point, are first deposited on the surface to be coated. Thereafter, a laser beam is passed over the deposit to melt the element having the lower melting point and also melt a limited portion of the substrate, thus adhering them together while retaining the wear-resistant particles after solidification of the melt for presenting a wear-resistant surface.

SUMMARY OF THE INVENTION

With the foregoing in mind, the present invention has as a main objective the disclosure of a process to impregnate the surface (including a thin sub-surface region) of a metal substrate with particles of a different and harder wear-resistant material to impart wear resisting characteristics to the surface. A metal which is to have its surface made more wear resistant first has its surface subjected to relative movement of a laser beam which melts a localized area progressively by passes of controlled depth and width across the surface. Small particles of hard wear-resistant material, such as carbides, nitrides and borides are forcibly injected by being propelled at high velocity, preferably by an inert gas, into the melt pool under or behind the laser beam. Any particles which pass through the laser beam do so with sufficient velocity so as not to be melted thereby. The particles are interspersed throughout the width and depth dimensions of the melt's cross-sectional extent and are fixedly embedded therein by metallurgical bond upon rapid solidification of the melt as the laser beam passes on. Since the injected particles are well dispersed throughout the melt, there is presented a wear resistant surface formed by the particles throughout the pass wherever it may be desired to provide a wear resistant surface.

It may be suggested that instead of blowing wear resisting particles into the melt, a wear resistant surface could be provided by sprinkling or otherwise depositing the particles onto the metal surface in front of the laser beam. The ineffectiveness of the latter procedure is illustrated in the photomicrograph (FIG. 2), which shows a sectional view through a surface prepared by such an arrangement, wherein it can be seen that only a few titanium carbide (TiC) particles are incorporated deep into the melt, apparently having been dragged down by convection surrents before solidification of the melt. A hardened surface may be produced on steel by pouring a fine stream of tungsten carbide (WC) on top of a weld puddle made on the component with an electric arc welder. This process would depend upon high density particles such as WC having time to infiltrate the melt before solidification, but if sufficient time is allowed for this infiltration the particles will dissolve excessively in the melt. The process would be ineffective in placing TiC in the melt because it has a lower density then steel and would tend to float on the melt.

OBJECTS OF THE INVENTION

It is therefore an object of the invention to provide an improved method of providing a substrate impregnated with hard particles to define a wear resistant surface.

It is another object of this invention to provide a wear resistant surface on a substrate by forcibly injecting small particles at high velocity into a melt, some of which will be captured below the surface at solidification.

Other objects and advantages of the invention will become more readily apparent upon reading the specification with reference to the accompanying drawings.

DESCRIPTION OF A PREFERRED EMBODIMENT

Figure 1:
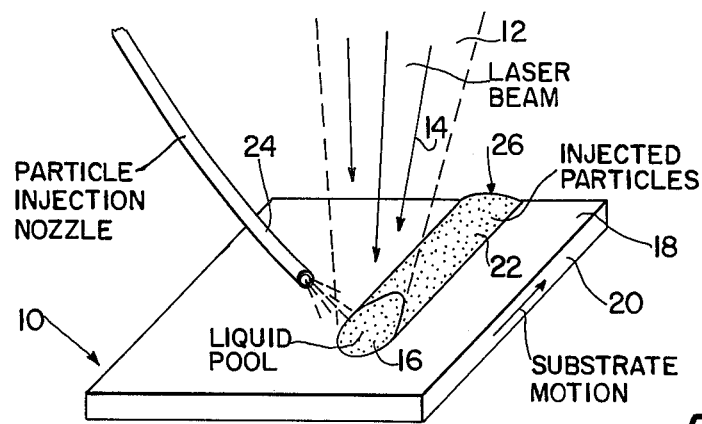
FIG. 1 is a perspective diagrammatic representation of apparatus for laying down one of a series or ribbon-like melt passes into which wear resistant particles are forcibly injected prior to solidification.

Referring now to FIG. 1, there is illustrated in diagrammatic form apparatus 10 for carrying out the concept of the invention. A high powered CW laser (not shown in the drawing) produces a beam 14 to melt a shallow pool 16 (typically about ½ mm deep by 2–3 mm wide) in upper surface 18 of metal substrate 20. The substrate is swept under the laser beam, or the laser beam is moved linearly across the substrate, at a velocity of 1 to 20 cm/sec. The laser power required to establish the molten pool in substrate 20 of titanium or nickel alloy, for example, is 1–15 kW, depending on the melt depth and velocity at which the laser beam translates the substrate, or vice versa. Simultaneously with the laser action of establishing a melt, particles 22 of a hard-phase material, such as carbide of tungsten or titanium, having wear resistant qualities, are injected into molten pool 16 from nozzle 24. The hard-phase wear-resistant particles have a preferred size range of 30 to 100 μm in diameter or in general cross-sectional dimension. Particles of the same size or particles of composite sizes (mix) may be employed. The process is preferably carried out in a vacuum chamber into which the particles are forcible propelled by a pressurized flow of helium or other inert gas. The particles emerge at high velocity from nozzle 24 which has a small diameter orifice (0.5 to 1.5 mm) directed at melt pool 16 under or just behind the laser beam which caused the melt. The end of the nozzle is as close to the pool as possible without having the nozzle in interference with the laser beam, and is preferably disposed at an angle to the melt surface. The laser beam 14 making a pass across the substrate melts a pool 16 only momentarily. The pool freezes in a fraction of a second, but prior thereto the hard particles have been injected.

In operation of the method, the particles emerge from the nozzle at a velocity of 1–20 meters per second and penetrate melt 16 with sufficient kinetic energy to embed themselves therein an instant before solidification. Their dispersal is dependent upon a number of factors such as velocity and size of the particles and their angle and location of introduction to the melt. Because the particles are only momentarily, if at all, exposed to the laser before entering the liquid, they are not heated to their melting temperature. Any exposure of the particles to the effects of the laser beam is only incidental and of no particular consequence. Heating of the particles by the laser beam is deliberately avoided, but it will be recognized that occasionally particles will stray into the effects of the beam. This is of no consequence. The particles, having been driven into the pool are exposed to the liquid for only a fraction of a second before the liquid freezes. Therefore, there is only limited opportunity for dissolution of the particles. The result is that the hard-phase particles retain substantially their original size and composition and are embedded and metallurgically bonded in a matrix of substrate material which retains substantially its original composition also. The hard-phase impregnated pass 26 laid across the surface of substrate 20 forms a wear-resistant surface layer at its upper surface and at all depths thereacross. Multiple passes are laid down side by side to cover a substantial area with the desired hard-phase particles embedded therein.

Figure 2:
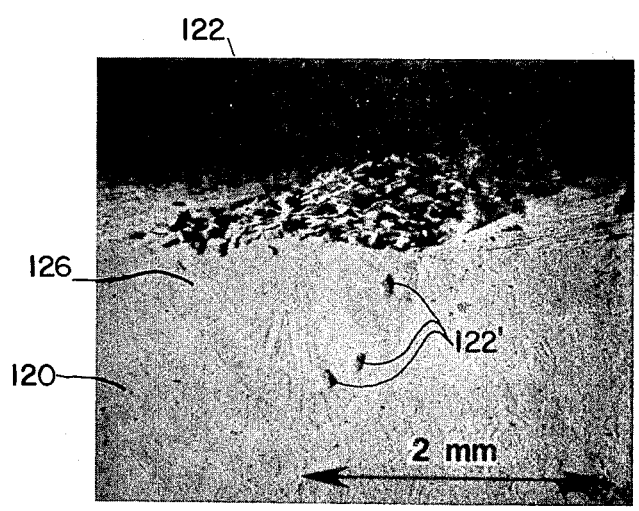
FIG. 2 is a photomicrograph of a polished and etched section through a solidified pass wherein the wear-resistant particles are introduced onto the melt by methods known in the prior art.

There is shown in FIG. 2 a cross-sectional photomicrograph of a polished and etched run 126 having been laid down in steel (substrate 120) by a traveling laser beam wherein the hard wear resistant particles (TiC) 122 were merely sprinkled or otherwise deposited on the top of the melt pool. An abundance of particles 122 lie on the upper surface of the pass because they never penetrated the melt before it became solidified. It will be noted in the photograph that only three particles 122' lie substantially below the surface. These isolated particles were apparently dragged down by convection currents in the pool an instant before freezing. Thus, a wear resistant coating is provided only on the upper surface, the overall effectiveness of which is substantially reduced after initial wear. Furthermore, when all the abrasive particles are at or near the surface, the passes do not allow for grinding or otherwise establishing a large flat wear-resistant coating.

Figure 3:
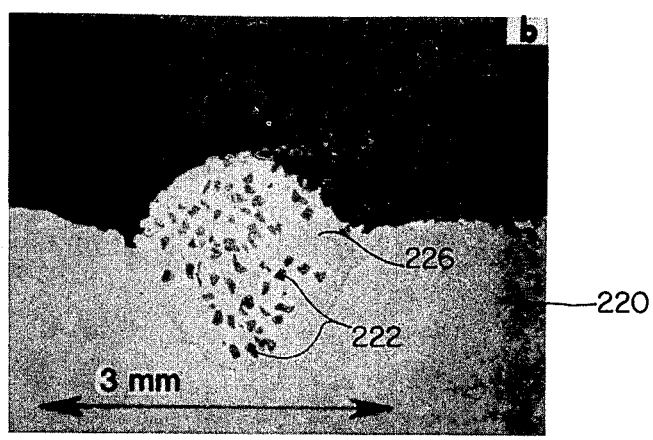
FIG. 3 is a photomicrograph of a polished and etched section through a solidified pass similar to FIG. 2, but showing wear-resistant particles that have been embedded in the melt, by forcible velocity injection.

In FIG. 3, there is illustrated another sectional photomicrograph through a pass 226 of TiC in a steel substrate 220 formed according to the present invention. The TiC particles 222, though having a density less than steel, are evenly dispersed throughout width and depth of the pass. As will be appreciated from an examination of the cross-sectional view of FIG. 3, there can be established wear-resistant surfaces throughout the depth of run 226.

The method described here is superior to old methods for applying wear-resistant coatings consisting of hard particles in a ductile matrix in that the ductile matrix in this method is intimately bonded to the substrate, being simply a part of the substrate which has melted and refrozen. The coating-substrate interface, which is a weak point on coatings applied by flame or plasma spray of detonation gun, does not exist in this process. Moreover this process is not restricted to systems in which the hard particles and ductile matrix are in thermodynamic equilibrium, as is the weld-cladding process. The hard particles are not melted in the laser beam, as they are in laser-spraying and they thus retain their original size and chemistry upon injection into the molten surface. A feature of the invention is that it provides a method for forcibly injecting at high velocity relatively large hard-phase particles, such as TiC or WC, to below the surface of a structural material. Other methods, such as depositing the hard particles on the surface prior to melt or sprinkling the particles on the melt pool, do not provide adequate dispersal of the particles through the melt before freezing. This was previously discussed and illustrated with reference to FIG. 2. It is required that the hard particles do not melt or decompose at temperatures equal to or a few hundred degrees above the melting point of the matrix, or substrate 20, to prevent dissolution of the particles in the molten matrix. Since the particles are injected into the melt with minimal exposure to the beam, little, if any, heating of the particles is produced. Even if there is some heat transfer to the particles such would not even approach the melting point, but possibly would aid wetting by the pool melt. Suitable classes of hard phase particles are carbides, silicides, nitrides and borides. The only requirement of the matrix material is that it be ductile enought to survive the thermal shock experienced by the process.

It has been determined that a coating applied by the disclosed process may contain hard wear-resistant particles ranging from 5-70% by volume fraction, but around 40% has been selected for both superior resistance and ability to resist cracking of the original substrate metal making up part of the coating. A higher acceptable volume fraction is possible when the particle sizes are mixed.

While the invention has been disclosed and described with particular reference to apparatus for carrying it into practice, it is evident that variations may become apparent and made thereto without departing from the spirit of the invention. The scope of the invention is limited only by the claims annexed hereto.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of providing a wear resistant-coating on a metal substrate comprising:
    liquifying a surface portion of the metal substrate by a relatively moving laser beam;
    forcibly injecting wear resistant particles into the liquid metal substantially out of the influence of the laser beam;
    allowing the liquid metal to solidify thereby trapping the wear-resistant particles embedded therein.

2. The method according to claim 1 wherein the laser beam moves across the substrate.

3. The method according to claim 2 wherein the laser beam moves at a speed of 1-20 centimeters per second.

4. The method according to claim 1 wherein the substrate is moved relative to a fixed laser beam.

5. The method according to claim 4 wherein the substrate moves at a speed of 1-20 centimeters per second.

6. The method according to claim 1 wherein the wear resistant particles are forcibly injected into the liquid metal by a propelling pressurized inert gas.

7. The method according to claim 6 wherein the propelling pressurized gas is helium.

8. The method according to claim 1 or 6 wherein the wear-resistant particles are forcibly injected into the liquid metal at a speed of 1 to 20 meters per second.

9. The method according to claim 1, wherein the wear resistant particles are of sizes ranging from 30 to 100 um.

10. The method according to claim 9 wherein the particle sizes being injected at any one time comprise a mix of sizes.

11. The method according to claims 1, 2, 4, 6 or 7 wherein the laser beam power is 1-15 kW which establishes a liquid melt pool approximately ½ mm deep by 2½ mm wide progressively across the substrate at 1 to 20 centimeters per second.

12. A method of providing a wear resistant coating on a metal substrate comprising:
    moving a laser beam relative to the substrate surface at a selected speed and power density level sufficient to cause localized pool melting in a pass of predetermined width and depth;
    forcibly propelling hard wear resisting particles toward the surface of the melt substantially out of the influence of the laser beam, by flow of pressurized inert gas with sufficient kinetic energy to cause the particles to penetrate the melt surface and become embedded throughout the melt before solidification;
    allowing the melt to solidify thereby trapping the particles therein by metallurgical bond.

13. The method according to claim 12 wherein the propelling pressurized gas is helium.

14. The method according to claim 12 wherein resistant particles are of sizes ranging from 30 to 100 um.

15. The method according to claim 14 wherein particles sizes injected comprise a mix of sizes.

16. The method according to claim 12, 14 or 15 wherein the hard wear-resistant particles comprise 5 to 70% by volume fraction of the wear resistant coating.

17. The method according to claim 12 wherein the wear resistant particles are propelled toward the surface of the melt just behind the laser beam.

18. The method according to claim 12 or 17 wherein the wear-resistant particles are propelled in a direction disposed at an angle to the general direction of the laser beam.

* * * * *